United States Patent [19]
Wilson et al.

[11] Patent Number: 4,733,491
[45] Date of Patent: Mar. 29, 1988

[54] FISHING LURE

[75] Inventors: William H. Wilson, Fort Smith; Jim Gowing, Altus, both of Ark.

[73] Assignee: Ebsco Industries, Inc., Leeds, Ala.

[21] Appl. No.: 886,066

[22] Filed: Jul. 16, 1986

[51] Int. Cl.⁴ .............................................. A01K 85/00
[52] U.S. Cl. .................................. 43/42.45; 43/42.33; 43/42.35
[58] Field of Search ................. 43/42.35, 42.33, 42.36, 43/42.45, 42.1, 42.53, 42.32

[56] References Cited

U.S. PATENT DOCUMENTS

| | | | |
|---|---|---|---|
| 2,641,080 | 6/1953 | Wise | 43/42.35 |
| 2,706,867 | 4/1955 | Ayres | 43/42.35 |
| 2,752,721 | 7/1956 | Denny | 43/42.35 |
| 2,995,857 | 8/1961 | Arff | 43/42.35 |
| 3,303,597 | 2/1967 | Leach | 43/42.35 |

Primary Examiner—M. Jordan
Attorney, Agent, or Firm—Laney, Dougherty, Hessin & Beavers

[57] ABSTRACT

A fishing lure which includes a hollow body generally resembling a natural bait species and having a diving plane at the forward end, and a tail at the rear end thereof. The lure further includes an upper body half and a lower body half. The upper body half joins the lower body half in a longitudinal medial plane which extends rearwardly from the diving plane to the tail of the lure. A graphite pull section is affixed to the diving plane so that a projecting blade portion of the graphite pull section extends upwardly from the upper side of the diving plane, and carries a hole for attachment of a fishing line. The lower body half has a pair of laterally spaced, longitudinally extending chines formed thereon to improve the hydrodynamic properties of the lure as it is retrieved.

11 Claims, 8 Drawing Figures

FISHING LURE

FIELD OF THE INVENTION

This invention relates to fishing lures, and more particularly, to crank bait type lures which resemble a natural bait species and which carries at the forward end thereof a diving plane and have one or more hooks swivelly connected to the lure body.

BACKGROUND OF THE INVENTION

General Description of The Invention

The fishing lure of the present invention comprises a two-part lure of the crank bait, hard body type, with two parts of the lure preferrably molded from synthetic resin so as to interfit, and interlocked to form a hollow lure body. The lure body simulates a naturally occuring bait species constituting the natural food of the fish to be caught by the use of the lure.

The two body halves—an upper half and a lower half—are joined along a longitudinally extending medial plane. The lower body half is formed with a pair of substantially parallel, longitudinally extending, spaced chines on the downwardly facing lower surface thereof. These chines define a trough or channel therebetwen through which the water flows during retrieval of the lure. The chine-trough arrangement provides improved hydrodynamic performance of the lure during its retrieve.

At the forward end of the hollow bodied lure, a conventional diving plane is provided. This diving plane extends forwardly and downwardly from the medial plane along which the upper and lower halves are joined.

A graphite pull section is keyed into the diving plane so that there is a blade portion of the graphite pull section which projects upwardly from the upper surface of the diving plane, and defines a hole facilitating the attachment of a retrieving line by which the lure is retrieved by the fisherman. Secured to a lower edge of the blade portion of the graphite pull section is a horizontally extending key plate. This key plate is of complimentary shape or configuration to a slot or keyway which is formed in the lower side of the diving plane. The graphite pull section is formed in a way which minimizes the opportunity for hanging of the lure in underwater brush or other obstructions, and facilitates the ease with which the lure can be retrieved.

An important object of the invention is to provide a lure of the crank bait, hard body type which is hollow, and which is assembled during manufacture in a way which allows various colors or patterns to be quickly imparted to the lure at the time when a pair of complimentary body halves are joined to each other.

A further object of the invention is to provide a lure which less frequently becomes hung in underwater brush and obstacles as a result of the way the lure is constructed, and particularly, as a result of the use of a graphite pull section as a part of the lure.

Another object of the invention is to provide a fishing lure which has improved hydrodynamic properties by reason of the configuration of the lure body.

Additional objects and advantages of the invention will become apparent as the following detailed description of a preferred embodiment of the invention is read in conjunction with the accompanying drawings which illustrate such preferred embodiment.

GENERAL DESCRIPTION OF THE DRAWINGS

DETAILED DESCRIPTION OF A PREFERRED EMBODIMENT OF THE PRESENT INVENTION

Figure 1:
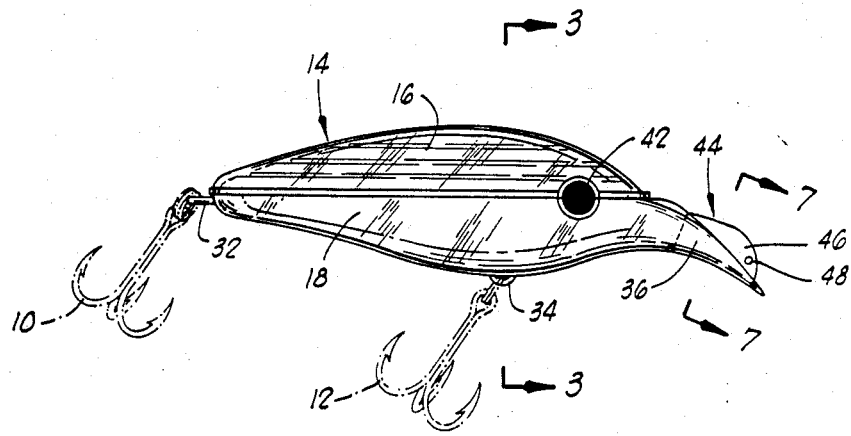
FIG. 1 is a side elevation view of a fishing lure constructed in accordance with this invention.

Referring initially to FIG. 1 of the drawings, a fishing lure constructed in accordance with the present invention will, in conventional fashion, be provided with two or more treble hooks, which are themselves conventional in crank bait-type fishing lures of the sort illustrated in the drawings. The fishing lure of this invention is a hard body crank bait-type lure, and carries two treble hooks, here shown in dashed lines and denominated by reference numerals 10 and 12. The body 14 of the fishing lure is preferably molded from synthetic resin, and is hollow.

The lure body 14 is made by assembling two parts. The body 14 thus includes an upper portion or upper body half 16 and a lower portion or lower body half 8. Each of the body halves 16 and 18 is molded from synthetic resin in the preferred embodiment of the invention, and each of the body halves is hollowed out and includes a concave inner side and a convex outer side. The body halves 16 and 18 are joined together by cementing, sonic welding or the like at a line of joinder which lies in a medial, longitudinally extending, horizontal plane which extends from the forward end of the lure to the tail thereof. This line of joinder at the medial plane is best illustrated in FIGS. 1-4 of the drawings.

The upper body half 16 of the lure body 14 is, as stated above, preferably molded of a synthetic resin or plastic, and is provided with a plurality of shoulders or steps 20 on the concave internal surface thereof. These shoulders or steps 20 which, from outside and above the lure body, appear as concentric ovals which are enlarged toward the forward end of the lure, function to reflect or refract light passing through the upper half 16 of the lure body 14 in a manner which is attractive to fish, particularly where the upper part of the body 16 is tinted by the inclusion of a fluorescent pigment therein.

Figure 2:
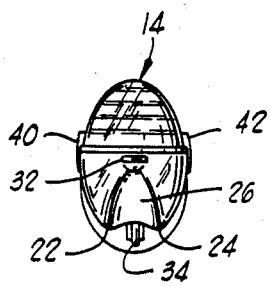
FIG. 2 is a rear elevation view of the fishing lure illustrated in FIG. 1.
Figure 3:
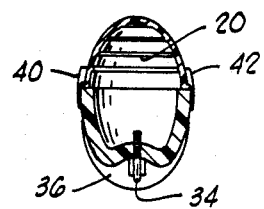
FIG. 3 is a sectional view taken along line 3—3 of FIG. 1.

The lower body half 18 is characterized in having a generally concave interior, upwardly facing surface and a generally convex exterior downwardly facing surface. At the lower side of the lower body half 18, a pair of longitudinally extending spaced and opposed parallel chines 22 and 24 are formed as shown in FIGS. 2 and 3. The chines 22 and 24 extend longitudinally along the opposite sides of the downwardly facing convex surface of the lower body half 18, and extend from the forward end or nose of the lure to the rear end thereof. The chines 22 and 24 define between them an elongated longitudinally extending trough 26. The effect of the location of the chines 22 and 24 on the lower side of the body half 18 is to improve the hydrodynamic properties of the lure during retrieve.

As illustrated in FIGS. 2 and 3, suitable eyelet rings 32 and 34 are provided at the tail or rear end of the lure, and at the central portion of the lower side of the body, respectively, as shown in FIGS. 2 and 3. These eyelet rings function as attachment points for the hooks 10 and 12.

Figure 4:
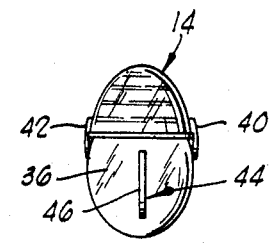
FIG. 4 is a front elevation view of the fishing lure depicted in FIG. 1.
Figure 5:
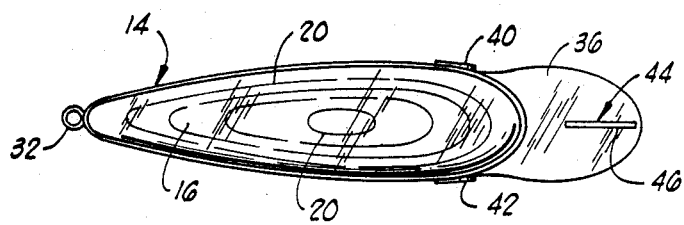
FIG. 5 is a top plan view of the fishing lure shown in FIG. 1.

At the forward or nose end of the lower body half 18, a diving plane 36 is secured to the forward end of the lower body half, and projects forwardly and downwardly therefrom, as is shown best in FIGS. 1, 4 and 5. The diving plane 36 functions in a manner well understood in the art. Structures 40 and 42 simulating eyes are provided on opposite sides of the lure body as shown in FIGS. 1 and 5.

An important feature of the present invention is the graphite pull section which is illustrated clearly in the drawings, and is there denominated generally by reference numeral 44. The graphite pull section includes a generally vertically projecting blade portion 46 which lies in a substantially vertical plane when the lure is in an attitude of retrieval, as shown in FIG. 1. The blade portion 46 of the graphite pull section 44 extends upwardly from the upper surface of the diving plane 36, and, in the illustrated embodiment, defines a hole or aperture 48 to which a retrieval line of conventional type can be attached.

Figure 7:
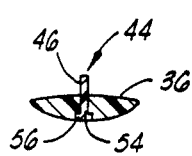
FIG. 7 is a sectional view taken along line 7—7 of FIG. 1.
Figure 6:
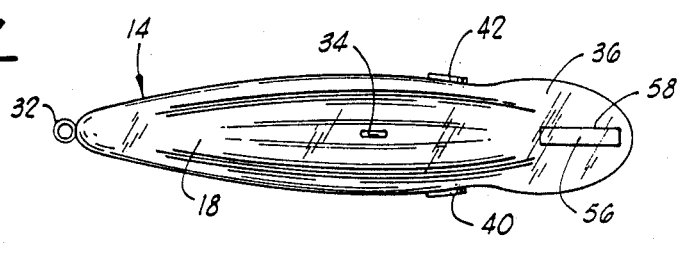
FIG. 6 is a bottom plan view of the fishing lure shown in FIG. 1.
Figure 8:
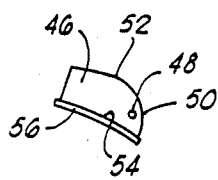
FIG. 8 is a side elevation view of a retrieval line pull section forming a part of the lure of the present invention.

The blade portion 46 includes a forward edge 50, a top edge 52 and a lower edge 54 (illustrated in FIGS. 7 and 8). At the intersection of the top edge and the forward edge, the blade portion 46 is rounded to avoid a sharp corner, with this place of intersection of the forward edge 50 and the top edge 52 being formed on a large radius as shown in FIGS. 1 and 8.

The lower edge 54 of the graphite pull section is secured to a key plate 56 which extends transversely of the lure, and substantially normal to the plane in which the blade portion 46 lies. The key plate 56 functions to key the graphite pull section to the diving plane by interfitting in a keyway recess or groove 58 formed in the lower side of the diving plane 36. Where the diving plane is shaped as shown in the lure illustrated in FIG. 1 of this application, both the lower edge 54 and the key plate 56 secured thereto will be slightly curved so that the key plate will fit properly within, and mate with, the keyway 58 formed in the lower surface of the diving plane.

The fact that the graphite pull section is made of graphite, and that it has the radiused corner at the intersection of the front edge and upper edge thereof, assures that the lure will not hang up or become caught on underwater brush or other obstacles as a result of catching at this particular corner on the graphite pull section. The lure can more easily swim over limbs. Other important functions are also attributal to the graphite pull section when the lure is placed in operation. For example, the graphite pull section provides a contact point which gives a better feel to the fisherman.

Although a preferred embodiment of the lure of the invention has been herein illustrated, it will be understood that various changes and innovations can be made in this lure without departure from the basic principles upon which the present invention is bottomed. Changes and innovations of this type are therefore deemed to be circumscribed by and lie within, the spirit and scope of the invention, except as the same may be necessarily limited by the appended claims or reasonable equivalents thereof.

What is claimed is:

1. A fishing lure comprising:
    a hollow body including:
        an upper body half having a forward end and a rear end and having a concave inner side and a convex outer, upwardly facing side;
        a lower body half having a forward end and a rear end and having a concave inner side and a convex outer, downwardly facing side, said lower body half further including a pair of opposed, transversely spaced, longitudinally extending chines located on said outer, downwardly facing side, said lower body half and upper body half being joined to each other along a longitudinally extending medial plane which extends horizontally from the forward end of the lure to the rear end thereof to form said hollow body in a configuration generally resembling a natural fish bait species; and
    a diving plane attached to the forward end of said lower body half and extending downwardly from said medial plane at an accute angle.

2. A fishing lure as defined in claim 1 and further characterized as including a graphite pull section secured to said diving plane, said pull section including:
    an upwardly projecting blade portion extending in a generally upward extending plane from the upper surface of said diving plane, said blade portion having a lower edge and carrying means for attaching a retrieving line thereto; and
    a key plate secured to the lower edge of said blade portion and extending substantially normal to said upward extending plane, said key plate keying said pull section to said diving plane.

3. A fishing lure as defined in claim 1 wherein said chines bound and define a centrally located trough extending along the downwardly facing side of said lower body half from the forward end thereof to the rear end thereof.

4. A graphite pull section adapated for attachment to a hard body crank bait-type fishing lure having a forwardly located diving plane comprising:
    a substantially monoplanar blade portion defining a hole for the attachment thereto of a lure retrieving line, said blade portion having a lower edge, a forward edge, a top edge and a rounded, large radiused corner at the intersection of the top edge and forward edge to obviate fouling of the lure; and
    a key plate secured across said lower edge and extending substantially normal to the plane of said blade portions.

5. A fishing lure comprising:
    a hollow body including:
        an upper body half having a forward end and a rear end and having a concave inner side and a convex outer, upwardly facing side, said upper body half further having and defining a plurality of ovel-shaped, offset steps in the concave inner side of said upper body half forming a plurality of concentric, oval-shaped, downwardly facing shoulders therein, each lying in a plane extending substantially parallel to said longitudinally extending medial plane; and a lower body half having a forward end and a rear end and having a concave inner side and a convex outer, downwardly facing side, said lower body half further including a pair of opposed, transversely spaced, longitudinally extending chines located on said outer, downwardly facing side, said lower body half and upper body half being joined to each other along a longitudinally extending medial plane which extends horizontally from the forward end of the lure to the rear end thereof to form said hollow body in a confiiguration generally resembling a natural fish bain species; and a diving plane attached to the forward end of said lower body half and extending downwardly from said medial plane at an acute angle.

6. A fishing lure as defined in claim 5 and further characterized as including a pull section secured to said diving plane, said pull section including:

an upwardly projecting blade portion extending in a generally upwardly extending plane from the upper surface of said diving plane, said blade portion having a lower edge and carrying means for attaching a retrieving line thereto; and a key plate secured to the lower edge of said blade portion and extending substantially normal to said upwardly extending plane, said key plate keying said pull section to said diving plane.

7. A fishing lure comprising:
a hollow body including:
an upper body half having a forward end and a rear end and having a concave inner side and a convex outer, upwardly facing side, said upper body half further including a plurality of oval-shaped, offset steps in the concave inner side of said upper body half forming a plurality of concentric, oval-shaped, downwardly facing shoulders therein;

a lower body half having a forward end and a rear end and having a convex outer, downwardly facing side, said lower body half and said upper body half being joined to each other along a longitudinally extending medial plane which extends horizontally from the forward end of the lure to the rear end thereof to form said hollow body; and a diving plane attached to the forward end of said lower body half and extending downwardly from said medial plane at an acute angle.

8. A fishing lure as defined in claim 7 and further characterized as including a pull section secured to said diving plane, said pull section including:

an upwardly projecting blade portion extending in a generally upwardly extending plane from the upper surface of said diving plane, said blade portion having a lower edge and carrying means for attaching a retrieving line thereto; and a key plate secured to the lower edge of said blade portion and extending substantially normal to said upwardly extending plane, said key plate keying said pull section to said diving plane.

9. A fishing lure comprising:
a hollow body including:
a hollow upper body half having a forward end and a rear end and having a concave inner side and a convex outer, upwardly facing side, said upper body half including a plurality of oval-shaped, offset steps in the concave inner side of said upper body half forming a plurality of concentric, oval-shaped, downwardly facing shoulders each lying in a substantially horizontal plane, with the planes in which said shoulders lie extending substantially parallel to each other; and a lower body half having a forward end and a rear end and having a concave inner side and a convex outer, downwardly facing side, said lower body half including a pair of opposed, transversely spaced, longitudinally extending chines located on said outer, downwardly facing side, said lower body half and upper body half being joined to each other along a longitudinally extending medial plane which extends horizontally from the forward end of the lure to the rear end thereof to form, by such joinder, said hollow body;

a diving plane attached to the forward end of said hollow body and extending from the hollow body downwardly at an acute angle with respect to said longitudinally extending medial plane; and a pull section secured to said diving plane, said pull section including:

a blade portion occupying a generally upwardly extending plane projecting form the upper surface of said diving plane, said blade portion having a lower edge and carrying means for attaching a retrieving line thereto; and a key plate secured to the lower edge of said blade portion and extending substantially normal to said upwardly extending plane, said key plate keying said pull section to said diving plane.

10. a fishing lure comprising:
a hollow body including:
an upper body half having a forward end and a rear end and having a concave inner side and a convex outer, upwardly facing side; and a lower body half having a forward end and a rear end and having a concave inner side and a convex outer, downwardly facing side, said lower body half further including a pair of opposed, transversely spaced, substantially generally parallel, longitudinally extending chines located on the outer, downwardly facing side, said chines bounding and defining a centrally located trough extending longitudinally along the downwardly facing side of said lure body half from adjacent the forward end therof toward the rear end thereof for imparting stability to said lure as said lure is retrieved through the water, said lower body half and said upper body half being joined to each other along a medial plane to form said hollow body in a configuration generally resembling a natural fish bait species;

a diving plane attached to the forward end of said hollow body and having an upper side and a lower side and extending downwardly and forwardly from said hollow body at an acute angle with respect to said medial plane, and said diving plane defining a slot in the lower side thereof; and a graphite pull section mounted on said diving plane, said pull section including:

an upwardly projecting blade portion extending in a generally upwardly extending plane from the upper surface of said diving plane, said blade portion having a lower edge, a forward edge, a top edge extending at substantially the same angle to said medial plane as said diving plane, and a rounded, large radiused corner at the intersection of the top edge and the forward edge of the blade portion to obviate fouling of the lure, said blade portion defining a hole for the attachment thereto of a lure retrieving line; and a key plate secured to the lower edge of said blade portion and extending substantially normal to said upwardly extending plane, said key plate keying said pull section to said diving plane and closely press interfitted in said slot in the lower side of said diving plane.

11. A fishing lure comprising:

a hollow body including:

an upper body half having a forward end and a rear end and having a concave inner side and a convex outer side; and a lower body half having a forward end anad a rear end and having a concave inner side and a convex outer, downwardly facing side, said lower body half further including a pair of opposed, transversely spaced, longitudinally extending chines located on said outer, downwardly facing side, said chines bounding and defining a centrally located trough extending longitudinally along the downwardly facing side of said lure body from adjacent the forward end thereof toward the rear end thereof for imparting stability to said lure as said lure is retrieved through the water, said lower body half and said upper body half being joined to each other along a medial plane to form said hollow body;

a diving plane attached to the forward end of said hollow body and having an upper side and a lower side, and extending downwardly and forwardly from said body at an acute angle with respect to said medial plane, and to a portion forward of, and aligned with, said trough;

a pull section mounted on said diving plane and including:

an upwardly projecting blade portion extending vertically from the upper surface of said diving plane, said blade portion having a lower edge, a forward edge and a top edge joined to the forward edge by a rounded corner; and a key plate secured to the lower edge of said blade portion.

* * * * *